(12) United States Patent
Jallon (10) Patent No.: US 9,195,913 B2
(45) Date of Patent: Nov. 24, 2015

(54) METHOD OF CONFIGURING A SENSOR-BASED DETECTION DEVICE AND A CORRESPONDING COMPUTER PROGRAM AND ADAPTIVE DEVICE

(75) Inventor: Pierre Jallon, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 251 days.

(21) Appl. No.: 13/222,169

(22) Filed: Aug. 31, 2011

(65) Prior Publication Data
US 2012/0054133 A1 Mar. 1, 2012

(30) Foreign Application Priority Data
Aug. 31, 2010 (FR) ...................................... 10 56894

(51) Int. Cl.
G06F 15/18 (2006.01)
G06K 9/62 (2006.01)
G06N 5/00 (2006.01)

(52) U.S. Cl.
CPC ................ *G06K 9/6297* (2013.01); *G06N 5/00* (2013.01)

(58) Field of Classification Search
None
See application file for complete search history.

(56) References Cited

U.S. PATENT DOCUMENTS

| 5,317,673 A | 5/1994 | Cohen et al. | |
|---|---|---|---|
| 6,064,958 A * | 5/2000 | Takahashi et al. | 704/243 |
| 2002/0184139 A1 * | 12/2002 | Chickering et al. | 705/38 |
| 2010/0070277 A1 * | 3/2010 | Arakawa et al. | 704/246 |
| 2010/0160744 A1 * | 6/2010 | Ha et al. | 600/301 |
| 2010/0217593 A1 * | 8/2010 | Shields et al. | 704/245 |
| 2011/0208730 A1 * | 8/2011 | Jiang et al. | 707/727 |

OTHER PUBLICATIONS

Hu and Yu, A Simple and Efficient Hidden Markov Model SCheme for Host-Based Anomoly Intrusion Detection, IEEE Network, Jan./Feb. 2009.*
"Bingo rules", verified by Wayback Machine to Jan. 3, 2008; downloaded Nov. 3, 2014, http://web.archive.org/web/20080103170106/http://www.bingorules.org/bingo-rules.htm.*
French Preliminary Search Report issued Jun. 29, 2011, in French 1056894, filed Aug. 31, 2010 (with English Translation of Categories of Cited Documents).

(Continued)

*Primary Examiner* — Kakali Chaki
*Assistant Examiner* — Michael Zidanic
(74) *Attorney, Agent, or Firm* — Oblon, McClelland, Maier & Neustadt, L.L.P.

(57) ABSTRACT

This method of configuring a device for detecting a situation from among a set of situations in which it is possible to find a physical system observed by a least one sensor, comprises the following steps: receiving (102) a training sequence corresponding to a determined situation of the physical system; determining (118) parameters of a statistical hidden Markov model recorded on the detection device and related to the determined situation, based on a prior initialization (104-116) of these parameters.

The prior initialization (104-116) comprises the following steps: determining (104, 106) multiple probability distributions from the training sequence; distributing (108-114) the determined probability distributions between the hidden states of the statistical model being used; and initializing the parameters of the statistical model being used from representative probability distributions determined for each hidden state of the statistical model being used.

13 Claims, 3 Drawing Sheets

(56) References Cited

OTHER PUBLICATIONS

Krishna Nathan, et al., "Initialization of Hidden Markov Models for Unconstrained On-line Handwriting Recognition," 1996 IEEE International Conference on Acoustics, Speech, and Signal Processing—Proceedings, XP000681789, May 1996, 4 pages.

Pierre Jallon, et al., "Detection system of motor epileptic seizures through motion analysis with 3D accelerometers," 2009 Annual International Conference of the IEEE Engineering in Medicine and Biology Society, XP031639459, Sep. 2009, 4 pages.

Lawrence R. Rabiner, "A Tutorial on Hidden Markov Models and Selected Applications in Speech Recognition," Proceedings of the IEEE, vol. 77, No. 2, XP002550447, Feb. 1989, pp. 257-286.

U.S. Appl. No. 13/884,814, filed May 10, 2013, Jallon.

* cited by examiner

METHOD OF CONFIGURING A SENSOR-BASED DETECTION DEVICE AND A CORRESPONDING COMPUTER PROGRAM AND ADAPTIVE DEVICE

This invention relates to a method of configuring a device for detecting a situation from among a set of situations in which it is possible to find a physical system observed by a least one sensor. It also relates to a corresponding computer program and an adaptive device for detecting a situation in which there is a physical system observed by at least one sensor.

By "physical system", this means any system producing a physical output that can be observed by a sensor, the system being a priori assumed to be able to be found in a predetermined number of situations modeled by the detection device.

The observed physical system may for example be an inanimate object, such as a structure whose state we want to monitor in order to detect possible anomalies or deformations using one or more sensors.

It can also be an animated system, such as a person or an animal, for example, suffering from a chronic disease with crisis situations that can be detected using a sensor. Depending on the sensor(s) used, there are various detectable situations and many applications.

In particular, one promising application is covered in the paper by P. Jallon et al, entitled "Detection system of motor epileptic seizures through motion analysis with 3D accelerometers," published at the IEEE EMBC 2009 conference. In this paper, an epileptic seizures detection device using movement sensors, specifically 3D accelerometers, is based on statistical hidden Markov models, each modeling at best, for a given situation, the statistical properties of observation sequences provided by the sensors as they are expected for this situation. Specifically, each statistical hidden Markov model in this device corresponds to a predetermined possible situation for a person subject to epileptic seizures, including, for example, a first crisis situation, a second crisis situation that is different from the first one, and a situation of no crisis. The detection principle then consists of selecting one of the possible situations by comparing the probabilities of the situations, knowing a sequence of observations provided by at least one accelerometer, the probabilities being calculated based on each of the statistical hidden Markov models in the device.

The problem with such a detection device is that it is not adaptive. The parameters of the statistical models are predetermined, specifically saved once and for all in the device, and must be able to remain relevant when the detection device is used by different people. Of course, because each person reacts differently in epileptic crisis situations or in a situation of no crisis, if the detection device is successful for one person, it will not necessarily be so for another.

More generally, it is known to configure or reconfigure a statistical hidden Markov model when one has at least one training sequence considered as representative of the assumed situation modeled by this statistical model.

Thus, the invention more specifically applies to a method of configuration comprising the following steps:
  receiving a sequence of observation data of the physical system, called a training sequence and corresponding to a determined situation of the physical system,
  determining, from the training sequence, the parameters of a statistical hidden Markov model relating to the determined situation, by prior initializing these parameters, then updating these initialized parameters.

Such a method of configuration is for example proposed in the paper by L. Rabiner, titled "A tutorial on Hidden Markov Models and selected applications in speech recognition," Proceedings of the IEEE, vol. 77, no. 2, pp. 257-286, February 1989. In this paper, the update is performed by an iterative expectation-maximization algorithm, specifically the Baum-Welch algorithm. But like any optimization algorithm using iterations, it is particularly sensitive to the prior initialization of the parameters to be optimized. In fact, if it is improperly initialized, the result it will provide, although numerically stable, may be largely sub-optimal, for example by converging toward a local maximum depending on the cost function it optimizes. At worst, it may not even converge numerically and provide aberrant output parameters.

In practice, the parameters to be initialized, and then eventually updated, for a statistical hidden Markov model, are:
  C, the number of hidden states in the statistical model that is used,
  $\pi_1, \ldots, \pi_C$, the C initial probabilities, independent of any observation, of each hidden state of the statistical model that is used,
  $(a_{i,j})_{1 \leq i, j \leq C}$, the matrix of probabilities for transition from each hidden state i to each other hidden state j in the statistical model that is used, and
  for each hidden state, the parameters of a probability distribution of the observation provided at each instant by the sensor, this observation being considered as a random variable.

Note that the Baum-Welch algorithm or any other known expectation-maximization algorithm does not allow the number C of hidden states to be updated, said number being considered a constant. C must therefore be set prior to the initialization, and it is not updated by the algorithm.

Also note that the probability distribution for each hidden state of the statistical model being used may be multidimensional if the observation is multidimensional, meaning that data provided by the sensor (or set of sensors) to the detection device contains multiple values. For example, if the probability distribution is chosen as being a normal distribution, the sufficient parameters for defining it are its expectation and its variance, which may be scalars when the probability distribution is one-dimensional, or respectively a vector and a matrix when the probability distribution is multidimensional.

Finally, note that the parameters of the statistical model being used can be determined based on one or more training sequences, knowing that it is generally recommended to use multiple sequences to statistically improve the adaptation of the statistical model being used based on the reality of observation sequences in the situation it is supposed to model. For a single training sequence, the cost function to optimize by updating the parameters in the statistical model being used corresponds to the probability of observing the training sequence by this model. For multiple training sequences, the cost function becomes the product of the probabilities of observing the training sequences, still by this same model.

To overcome the shortcomings of the algorithm for updating the initialized parameters, a well-known solution consists of providing multiple sets of initial parameters, executing the expectation-maximization algorithm on each set of initial parameters, and finally selecting the one that provides the best value for the optimized cost function. This solution reduces the risk of ending up in an unfavorable case of executing the algorithm, but it does not solve the problem of initialization and greatly increases the processing involved with the training sequence.

Other solutions include trying to directly improve the prior initialization step.

A method of initializing hidden Markov models is for example described in the paper by K. Nathan et al, titled "Initialization of hidden Markov models for unconstrained on-line handwriting recognition", published during the ICASSP conference, 1996. In this paper, each hidden state in a Markov model has multiple summed normal distributions whose parameters are obtained by an upfront classification of the observations. These normal distributions are common to all of the states, these states being differentiated only by weight coefficients. The initialization actually involves determining these weight coefficients. However, this method is specific to a model that is very specifically tailored to handwriting recognition. It cannot be generalized to all hidden Markov models.

In the P. Smyth paper, titled "Clustering sequences with hidden Markov models", published in Advances in Neural Information Processing Systems, 1996, the authors group the training sequences according to some measure of similarity. For each of these groups, a model is learned, and the model computed for the initialization of the Baum-Welch algorithm is the concatenation of these different models. The disadvantage of this method is multiplying the number of hidden states in the final model by the concatenation operation. Consequently, the final model over-describes the signals of the training sequence, which in addition to increasing the complexity of the processing, can significantly disrupt the performance of the detection device.

It may therefore be desirable to provide a method of configuration that can overcome at least some of the above problems and constraints.

The invention therefore relates to a method of configuring a device for detecting a situation from among a set of situations in which it is possible to find a physical system observed by a least one sensor, comprising the following steps:
  receiving a sequence of observation data of the physical system, called a training sequence, provided by the sensor and corresponding to a determined situation of the physical system,
  determining, from the training sequence, the parameters of a statistical hidden Markov model recorded onto the detection device's storage media and relating to the determined situation, by prior initializing these parameters, then updating these initialized parameters,
  configuring the detection device so that the statistical model being used incorporates the determined parameters,
the prior initialization comprising the following steps:
  with the statistical model being used having a given number of hidden states, determining multiple probability distributions from the training sequence, by dividing the sequence into sub-sequences and assigning to each sub-sequence a probability distribution statistically modeling it, the number of determined probability distributions being greater than the number of hidden states in the statistical model being used,
  distributing said determined probability distributions between the hidden states of the statistical model being used,
  determining, for each hidden state in the statistical model being used and, from the probability distributions assigned to said hidden state, a single probability distribution that is representative of said hidden state, and
  initializing the parameters of the statistical model being used from the determined representative probability distributions, wherein the method also includes a configuration step for the detection device such that the statistical model being used includes the parameters determined by said prior initialization and then said update.

Therefore, the initialization of the parameters of any one of the statistical models of the detection device can be used on the basis of another very fine model applied to the training sequence, this other very fine model being able to present a much higher number of probability distributions than the number of hidden states in the model being used. The reduction of this very fine model, by distributing its probability distributions among the hidden states in the model being used, then using this distribution to determine the representative probability distributions of the hidden states, makes it possible to finely initialize the model being used, even if it has a limited number of hidden states. Updating these parameters by known methods then produces a globally optimal result. Consequently, the adaptation of the detection device to the physical system observed is improved.

Optionally, the distribution comprises the execution of an iterative K-Means algorithm on a number of classes equal to the number of hidden states in the statistical model being used, this iterative algorithm comprising, at each iteration:
  an estimate of distances between probability distributions using the Kullback-Leibler divergence, and
  the calculation, for each class, of a probability distribution representing its center.

Also optionally, the distribution comprises an initialization of the iterative K-Means algorithm, consisting of:
  sorting the probability distributions in ascending order of one of the parameters of said distributions,
  distributing the sorted probability distributions into the classes in this ascending order, from the first to the last class,
  for each class initialized in such a way, determining a probability distribution that represents its center.

Also optionally, with each probability distribution being a normal distribution, the sorting of the probability distributions during the initialization of the iterative K-Means algorithm involves sorting an expectation component of said normal distributions.

Also optionally, with each probability distribution being a normal distribution, the probability distribution representing the center of a class Ki is a normal distribution determined by the calculation of its expectation $\mu_i$ and its variance $\Sigma_i$ based on the expectations $\mu_{i,j}$ and variances $\Sigma_{i,j}$ of all probability distributions of this class Ki, as follows:

$$\mu_i = \frac{1}{\text{Card}(Ki)} \sum_{j \in Ki} \mu_{i,j} \text{ and } \Sigma_i = \frac{1}{\text{Card}(Ki)} \sum_{j \in Ki} (\Sigma_{i,j} + \mu_{i,j}^H \mu_{i,j}) - \mu_i^H \mu_i,$$

where Card is the "Cardinal" function and H is the Hermitian operator.

Also optionally, the update for the parameters of the statistical model being used includes the execution of the Baum-Welch algorithm on the training sequence.

Also optionally, the prior initialization of the parameters of the statistical model being used also comprises:
  the initialization of the initial probabilities of each hidden state at a common value of equiprobability, and
  the initialization of the matrix of transitions from each hidden state to each other at a matrix whose diagonal coefficients are equal to a first near value of 1, specifically between 0.8 and 1, and whose other coefficients are equal to a second near value of 0, specifically between 0 and 0.2.

The invention also relates to a computer program that can be downloaded from a communication network and/or saved on a computer-readable medium and/or executed by a processor, comprising instructions for executing the steps of a configuration method such as defined above, when said program is executed on a computer.

The invention also relates to an adaptive device for detecting a situation from among a set of situations in which it is possible to find a physical system observed by at least one sensor, from observation data of the physical system provided by the sensor, comprising:
at least one sensor for providing a sequence of observation data of the physical system,
means of storage, for each situation in the set of situations, of a statistical hidden Markov model,
a computer, connected to the sensor and to the storage means, programmed to select one of the situations by comparing probabilities of these situations, knowing the observation data sequence, the probabilities being estimated based on stored statistical models,
in which the computer is also programmed to execute the steps of a configuration method, as defined above, upon receiving a sequence identified as a training sequence corresponding to a determined situation of the physical system.

Optionally, the sensor includes at least one of the elements of the set comprised of a movement sensor with at least one measurement axis, a pressure monitor, a heart rate monitor, and a glucose monitor.

The invention will be better understood using the following description, given purely as reference and referring to the accompanying drawings, in which.

Figure 1:
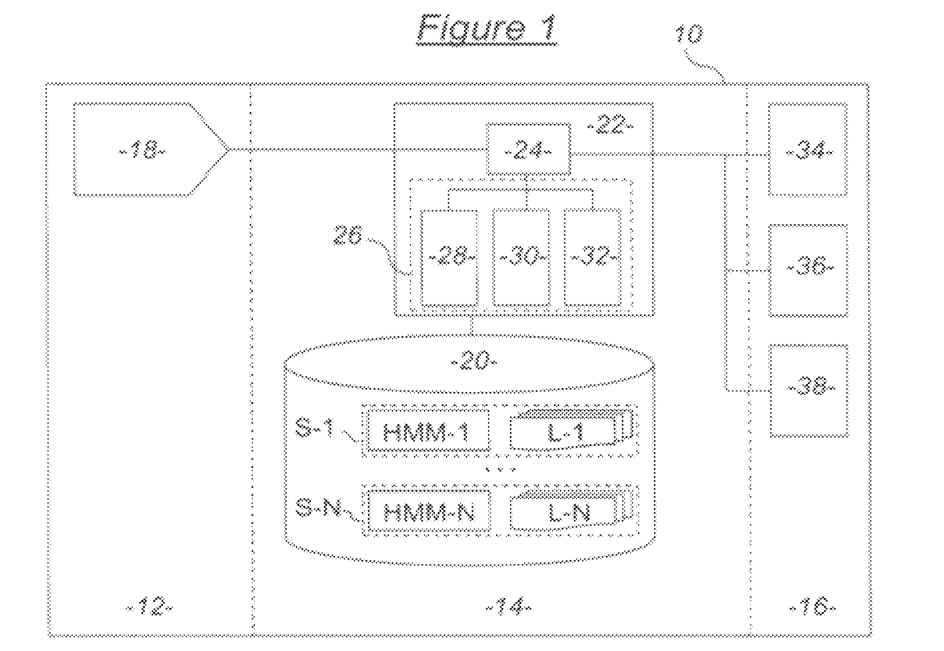
FIG. 1 schematically shows the general structure of a detection device according to an embodiment of the invention.

This device 10 shown in FIG. 1 is an adaptive device for detecting a situation from among a set of situations in which it is possible to find a physical system observed by a least one sensor. For this, it includes an observation module 12, a processing module 14, and an interface module 16.

The observation module 12 includes one or more sensors represented by the unique reference 18 for the observation of the physical system.

Some non-exclusive examples of sensors and situations that can be observed using these sensors are given:
the sensor 18 may, for example, include a movement sensor with one, two, or three measurement axes, including a 3D accelerometer worn by an individual, for determining an epileptic seizure or the absence of an epileptic seizure in the individual,
more generally, it may include a movement sensor for determining the activity of a mobile system in a set of predetermined activities,
it may include a heart rate monitor for determining an activity in the individual,
it may include a sensor that monitors glucose in an individual or animal suffering from diabetes for determining a crisis situation or the absence of a crisis,
it may include a pressure monitor to determine the operating situation (normal, borderline, abnormal) of an installation under pressure,
etc.

The sensor 18 may also include multiple sensors, each providing observations that, combined, can make it possible to detect more complex situations.

It takes measurements on the physical system to provide at least an observation signal, transmitted in the form of sequences of observation data to the processing module 14. The observation data can come directly from a sampling of the observation signal or obtained after one or more rounds of processing, including one or more filters, of this signal. The observation data is understood to contain one or more values, including when there is only one sensor 18.

The processing module 14 is an electronic circuit board, such as in a computer. It includes means of storage 20, such as RAM, ROM, or other memory, where the parameters of statistical hidden Markov models are stored.

Each situation S-1, . . . , S-N intended to be detectable by the detection device 10 using the sensor 18 is modeled by a corresponding statistical hidden Markov model, denoted HMM-1, . . . , HMM-N.

Any one of the stored statistical hidden Markov models, denoted HMM-n and modeling the situation E-n, is defined by the following parameters:
$C_n$, the number of hidden states in this model HMM-n,
$\pi_1, \ldots, \pi_{C_n}$, the Cn initial probabilities, independent of any observation, for each hidden state of this model HMM-n,
$(a_{i,j})_{1 \leq i,j \leq C_n}$, the matrix of probabilities for transition from each hidden state i to each other hidden state j in this model HMM-n, and
for each hidden state, the parameters of a probability distribution for the observation provided at each instant by the sensor.

As a non-exclusive example to simplify the notations, the probability distribution for each hidden state i in the model HMM-n can be chosen from the family of normal distributions. In this case, it is defined by its expectation $\mu n_i$ and its variance $\Sigma n_i$. When the data provided by the sensor 18 has multiple values, $\mu n_i$ is a vector comprising as many components and $\Sigma n_i$ is a matrix comprising as many rows and columns as there are values provided at each instant.

The memory 20 can also store, in association with each model HMM-n, one or more training sequences L-n. Each training sequence for the model HMM-n is actually an observation sequence provided by the sensor 18, but a priori known to be extracted from the observation of the physical system while it was in the situation S-n. It can therefore be processed upon receipt by the processing module 14, or even stored in memory 20 in relation with the model HMM-n for future processing, for configuration or reconfiguration of the detection device 10 by updating the parameters of the model HMM-n, as will be detailed with reference to FIG. 3.

The processing module 14 also includes a computer 22, for example a computer's central processing unit, equipped with a microprocessor 24 and a storage space for at least one computer program 26. This computer 22, and more specifically the microprocessor 24, is connected to the sensor 18 and to the memory 20.

The computer program 26 fulfills three main functions, illustrated by modules 28, 30, and 32 in FIG. 1.

The first function, performed by the detection module 28, for example in the form of an instruction loop, is a function for detecting a situation in which the physical system is found, upon receipt of an observation sequence provided by the sensor 18. More specifically, the detection module 28 is programmed to select one of the situations S-1, . . . , S-N by comparing the probabilities of these situations, knowing the observation sequence, the probabilities being estimated based on the stored statistical models HMM-1, . . . , HMM-N. The resolution of this selection using statistical hidden Markov models is well known and including in the three major categories of problems resolved by hidden Markov models, as mentioned in the L. Rabiner paper mentioned above. The method used will therefore not be detailed.

The second function, performed by the recording module 30, for example in the form of an instruction loop, is a function for recording, in the memory 20, an observation sequence in relation to one of the situations S-1, . . . , S-N. This observation sequence then becomes a training sequence to be used to configure or reconfigure the detection device 10.

The third function, performed by the configuration module 32, for example in the form of an instruction loop, is a function for reconfiguring the detection device 10 by updating the parameters of at least one statistical model HMM-n stored in memory 20 using a training sequence or a corresponding set of training sequences L-n. This function will be detailed with reference to FIG. 3.

To select which function the processing module 14 must perform, the interface module 16 may include a mode selector 34 controlled by a user, specifically the individual wearing the detection device 10, when the observed physical system is an individual.

In a simple embodiment, it may be interpreted that the detection device 10 works by default in detection mode, thus executing the detection module 28. Because one of the advantages of the detection device 10 is detecting at least one critical situation from among a set of possible situations, such as an epileptic seizure in the wearer of the device subject to this type of situation, the interface module 16 may also include an alert trigger 36. This trigger may, for example, include a screen (to display a warning message), a speaker (to emit an audio signal), or a transmitter (to transmit a signal to a remote alarm).

At the request of the operator via the mode selector 34, the detection device 10 may temporarily switch to recording mode, when an observation sequence associated with a known situation in the observed physical system is provided by the sensor 18 and must be recorded as a training sequence in the memory 20. The detection device may then include a recording interface 38, by which the operator defines the observation sequence (for example by marking its start and end) and associates it to one of the possible situations. The recording interface 38 may include, traditionally, a screen and/or means of input.

At the request of the operator via the mode selector 34 also, the detection device 10 may temporarily switch to configuration mode, when the operator believes that there are sufficient training sequences in memory 20 to improve the adaptation of the detection device 10 to the observed physical system.

Note that the observation module 12, processing module 14, and interface module 16 are structurally separable. Therefore, the detection device 10 can be designed as one piece or as several distinct hardware elements connected together by means of wired or wireless data transmission. Specifically, the processing module 14 and possibly the interface module 16 can be implemented by a computer. Only the observation module 12 is required to be in the vicinity or in contact with the physical system being observed since it includes the sensor(s).

Figure 2:
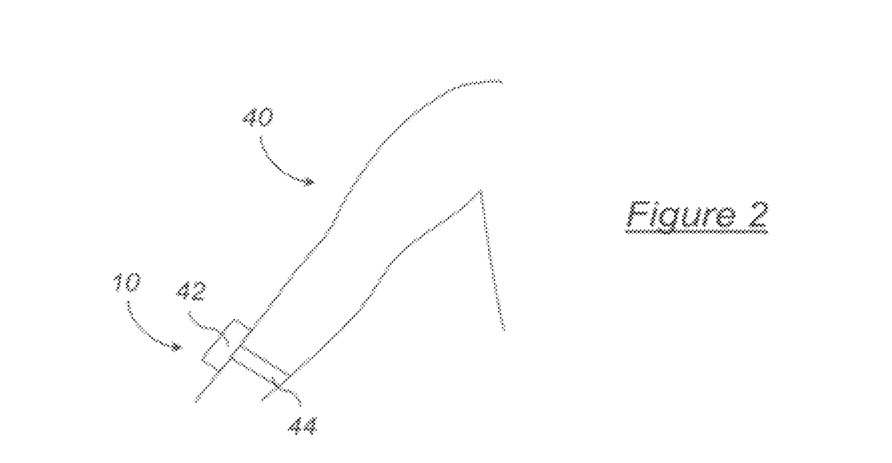
FIG. 2 illustrates a particular use of the detection device in FIG. 1.

In FIG. 2, a particularly compact embodiment is illustrated, for an application for monitoring an individual 40. According to this embodiment, the detection device 10 is entire embedded in a box 42 worn by the individual. The sensor is, for example, a 3D accelerometer, and the observed situations are, for example, twofold, such as an epileptic seizure modeled by a statistical model HMM-1 and a situation of no epileptic seizure modeled by a statistical model HMM-2. For this application, the box 42 is, for example, firmly held to an arm belonging to the individual 40 by means of a strap 44, such that the detection device 10 is worn like a watch.

Figure 3:
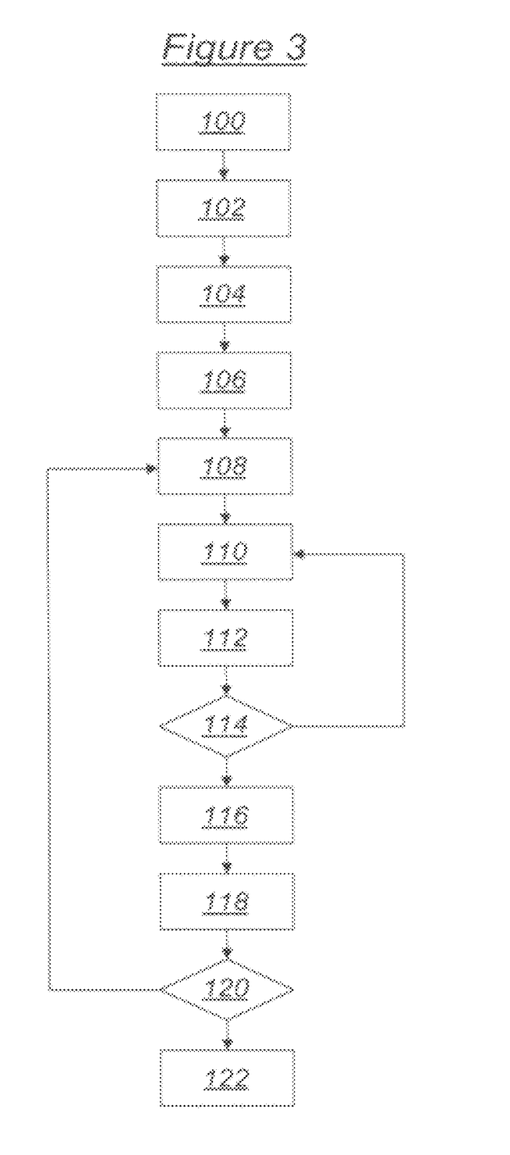
FIG. 3 illustrates the successive steps of a configuration method, for example for the device in FIG. 1, according to an embodiment of the invention.

The operation of the configuration module 32 will now be detailed with reference to FIG. 3 using the example of a configuration of the detection device 10 by updating the parameters of any one (HMM-n) of the statistical models stored in the memory 20. The execution of the configuration module 32 by the microprocessor 24 produces the sequence of steps illustrated in this figure.

During a first step 100, in a range of possible values for the number of hidden states that may be presented by this model HMM-n, this number is set to Cn. An example of a range of possible values is [3;10]. For a first value, Cn can take the first value in this range.

During a step 102, a set L-n of training sequences related to the situation S-n modeled by the statistical hidden Markov model HMM-n is received by the microprocessor 24 for processing by the configuration module 32. It can be received directly from the sensor 18, but more commonly, it is extracted from the memory 20 in which the training sequences may have been recorded at very different times, particularly during different occurrences of the situation S-n. Specifically, for an application for detecting epileptic seizures, knowing that the observations sequences transmitted by the sensor 18 may be processed by the detection module 28 in sliding windows of observations of, for example, 45 seconds, at a rate of 25 samples per second, each training sequence may represent several minutes of operation. Therefore, in total, a set of training sequences may last several minutes, even an hour or more.

During the next steps 104 and 106, multiple probability distributions are determined from the training sequence, the number Ln of determined probability distributions being greater than, or much greater than, Cn.

More specifically, during the step 104, the number Ln of probability distributions to be determined may optionally be obtained by dividing all of the training sequences into sub-sequences of one second each. In the above example, this results in sub-sequences of 25 samples. In general, a sub-sequence of 25 pieces of data with one or more values may be enough to determine a probability distribution, particularly a normal distribution, statistically modeling this sub-sequence correctly. Furthermore, the division of the training sequence into sub-sequences can be performed with or without overlapping between successive sub-sequences.

Therefore, during the step 106, each sub-sequence is associated with a corresponding probability distribution, for example a normal distribution of parameters $\mu n_j$ (expectation) and $\Sigma n_j$ (variance). At this stage of the method, the determination of the Ln distributions, and thus their parameters $\mu n_j$ and $\Sigma n_j$ is simple. Simply calculate the average and variance of each sub-sequence, considered to be estimators of $\mu n_j$ and $\Sigma n_j$.

During this same step, the Ln probability distributions are sorted in ascending order of the first component of the expectation parameters $\mu n_l$. In the specific case of one-dimensional training sequences, the sorting is done in ascending order of the expectations. This results, for example, in a distribution D as illustrated in FIGS. 4A to 4D.

During the next step 108, an initial distribution of the determined probability distributions is performed between the Cn hidden states of the statistical model HMM-n. This distribution is done based on the previous sorting. For example, if Ln is a multiple of Cn, if ∃k/Ln=k·Cn, we can assign the first k probability distributions to a first hidden state, the next k to a second state, and so on until the last hidden state. If Ln is not a multiple of Cn, the distribution can be done on the same basis, for example by ignoring the last sub-sequences. This step corresponds to an initial classification of the Ln probability distributions into Cn classes by equal division, each class corresponding to a hidden state.

During the next step 110, for each class Ki ($1 \leq i \leq Cn$) and based on a calculated average of the probability distributions assigned to this class Ki, a probability distribution is determined that represents its center. Y is a random variable that follows the distribution of this center. If the center must represent the average of the probability distributions of the class Ki, then we can write:

$$Y = \sum_{l \in Ki} 1(X = l) Z_l,$$

where $Z_l$ is a random variable that follows the normal distribution for index l and parameters $\mu n_{i,l}$ and $n_{i,l}$ of the class Ki, and where X is a random variable that is equal to l if Y follows the same probability distribution as $Z_l$.

The distribution of the center of the class Ki is a sum of the normal distributions that can be estimated, but it is also possible to approach it simply by using a normal distribution of parameters $\mu n_i$ and $\Sigma n_i$. We then have:

$$\mu n_i = E_{X,Z}(Y) = E_{X,Z}\left(\sum_{l \in Ki} 1(X = l) Z_l\right) = \sum_{l \in Ki} E_{X,Z}(1(X = l)) E_{X,Z}(Z_l), \quad (1)$$

then $$\mu n_i = \frac{1}{\text{Card}(Ki)} \sum_{l \in Ki} \mu n_{i,l}, \text{ where Card is the ``Cardinal'' function}$$

and $$\Sigma n_i = E_{X,Z}((Y - E_{X,Z}(Y))^H (Y - E_{X,Z}(Y))) =$$
$$E_{X,Z}(Y^H Y) - E_{X,Z}(Y)^H E_{X,Z}(Y),$$
$$\Sigma n_i = E_{X,Z}\left(\left(\sum_{l \in Ki} 1(X = l) Z_l\right)^H \left(\sum_{m \in Ki} 1(X = m) Z_m\right)\right) - \mu n_i^H \mu n_i,$$
$$\Sigma n_i = \sum_{l,m \in Ki} E_{X,Z}(1(X = l) 1(X = m) Z_l Z_m) - \mu n_i^H \mu n_i,$$
$$\Sigma n_i = \frac{1}{\text{Card}(Ki)} \sum_{l \in Ki} E_{X,Z}(Z_l^H Z_l) - \mu n_i^H \mu n_i, \text{ then}$$
$$\Sigma n_i = \frac{1}{\text{Card}(Ki)} \sum_{l \in Ki} (\Sigma n_{i,l} + \mu n_{i,l}^H \mu n_{i,l}) - \mu n_i^H \mu n_i, \quad (2)$$

where H is the Hermitian operator.

Equations (1) and (2) show that, as the center of any class Ki is defined, it is possible to simply calculate its parameters of normal distribution $\mu n_i$ and $\Sigma n_i$ from the parameters $\mu n_{i,l}$ and $\Sigma n_{i,l}$ of the normal distributions of class Ki.

During a next step 112, based on the Cn centers determined in the previous step, a new distribution of the Ln probability distributions determined in step 106 is made using a function that finds the "distance" between normal probability distributions. More specifically, for each probability distribution determined in step 106, its "distance" is calculated with respect to each of the centers and then assigned the class Ki with the nearest center.

For this, we define a "distance" function between normal distributions based on the Kullback-Leibler divergence. Because this divergence is not commutative, it is not strictly a distance, but can still be comprised of a model that can be used at each classification step. Remember that the Kullback-Leibler divergence is written as followed for two probability distributions p and q:

$$D_{KL}(p \| q) = \int \log\left(\frac{p(u)}{q(u)}\right) p(u) du.$$

For normal distributions $pn_l$ and $pn_k$ with respective parameters $\mu n_l$, $\Sigma n_l$, and $\mu n_k$, $\Sigma n_k$, it takes the following form:

$$D_{KL}(pm_l \| pn_k) =$$
$$\frac{1}{2}\left(\log\left(\frac{|\Sigma n_k|}{|\Sigma n_l|}\right) + Tr(\Sigma n_k^{-1} \Sigma n_l) + (\mu n_l - \mu n_k)^H \Sigma n_k^{-1} (\mu n_l - \mu n_k) - N\right),$$

where $|\Sigma|$ is the absolute value of the matrix determinant $\Sigma$, Tr the Trace function and N the number of components in the vector $\mu n_l$ or $\mu n_k$.

Following the steps 110 and 112, we move to a step 114 during which a stop criteria is tested, comprising at least one of the following two conditions:
  the new distribution, obtained from the step 112, of the Ln probability distributions determined in the step 106 is unchanged from the previous distribution (i.e. initial distribution in the step 108 or distribution obtained during a previous execution of the step 112),
  the steps 110 and 112 were repeated a number Nmax of times, Nmax being a predetermined constant.

If the stop criteria is not satisfied, the configuration module 32 returns to the step 110 for another execution of the steps 110 and 112. Otherwise, it goes to a step 116 to initialize the parameters of the statistical model HMM-n using the result of the loop from steps 110 to 114.

Note that the loop from steps 110 to 114 includes an implementation of the K-Means algorithm for the unsupervised automatic classification of the Ln normal distributions in Cn classes corresponding to the Cn hidden states of the model HMM-n. The result of this application of the K-Means algorithm to the Ln probability distributions determined in the step 106 is an optimized distribution of these probability distributions between the Cn hidden states of the statistical model HMM-n. In addition, each center of parameters $\mu n_i$ and $\Sigma n_i$ calculated at the last execution of the step 110 constitutes a single probability distribution representative of the class (i.e. the hidden state) of which it is the center.

The initialization 116 of the parameters of the statistical model HMM-n is done, based on the previously mentioned result, as follows:
  the number of hidden states of the initialized model HMM-n is set to the value Cn,
  the Cn initial probabilities $\pi_1, \ldots, \pi_{C_n}$ of the model HMM-n are initialized to a common value of equiprobability of 1/Cn,
  the matrix of transition probabilities $(a_{i,j})_{1 \leq i,j \leq Cn}$ for the model HMM-n is initialized in a matrix whose diagonal coefficients are equal to a first near value of 1, specifically between 0.8 and 1, and whose other coefficients are equal to a second near value of 0, specifically between 0 and 0.2, and the parameters of the probability distribution of the observation provided at each instance by the sensor 18 for the hidden state Ki are initialized to those, $\mu n_i$ and $\Sigma n_j$, of the center, calculated during the last execution of the step 110, for this hidden state.

Following this initialization step 116, we move to a step 118 for updating, from the set of training sequences, the parameters initialized from the model HMM-n. This update is performed, as previously indicated, by the execution of an iterative expectation-maximization algorithm, specifically the Baum-Welch algorithm, on the set of training sequences. Given the relevance of the initialization described previously, this step provides the parameters of the model HMM-n globally optimized with respect to the set of the training sequences, for a given number Cn of hidden states.

During the next step 120, a test is performed to find out whether the series of steps 108 to 118 must be executed again for a new value of Cn. Cn is, for example, incremented by one unit, and if it remains within the mentioned range of possible values, the method moves to the step 108. Otherwise, it goes to a last step 122 for configuring the detection device 10 so that the statistical model HMM-n includes the parameters that were ultimately determined.

More specifically, during this last step 122, multiple sets of parameters compete, corresponding to multiple values of Cn. This step is to select one of them. The configuration module 32 may, for example, take what is given as the best value from the cost function used in the execution 118 of the Baum-Welch algorithm. Then, this set of parameters that is ultimately determined for the statistical model HMM-n is recorded in the memory 20.

Figure 4A:
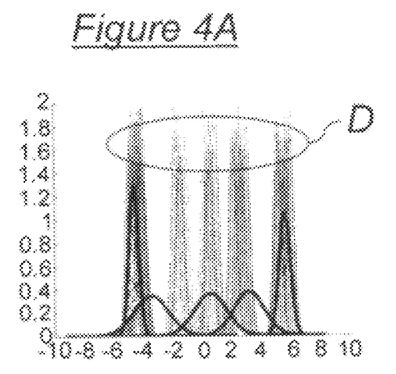
FIGS. 4A to 4D illustrate, using diagrams, the intermediary results of a distribution step in the configuration method in FIG. 3.

FIG. 4A illustrates, using a diagram, the result of the step 108 and of the first execution of the step 110 on a set of Ln normal distributions, consistent with what is actually obtained from a training sequence for an epileptic seizure situation, previously sorted for Cn=5. The five centers of the five classes, in which the Ln normal distributions are equally distributed, are shown using thick lines.

Figure 4B:
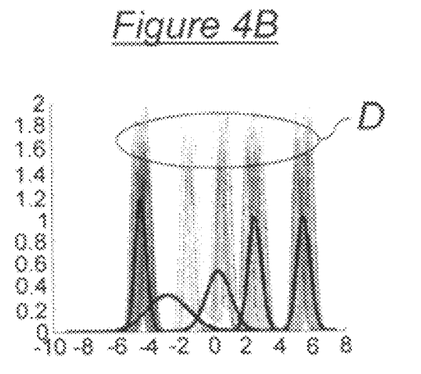
Figure 4C:
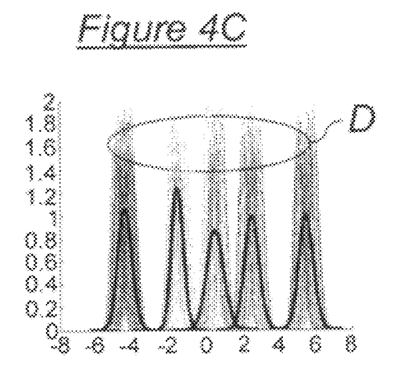
Figure 4D:
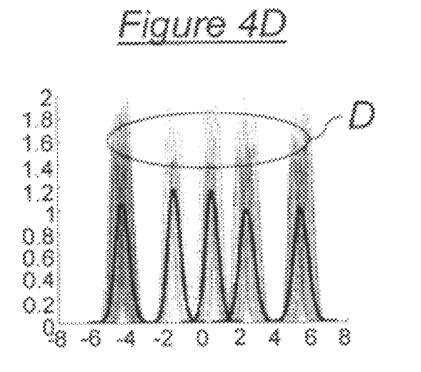

FIGS. 4B, 4C, and 4D respectively illustrate what happens to these five centers after the first, second, and third iterations of the loop of steps 112-114-110. Assuming that FIG. 4D illustrates the result used in the step 116, note that the five centers that are ultimately obtained are highly representative of the set Ln of the probability distributions extracted from the set of training sequences. In any case, they are much more representative of the Ln probability distributions than the five initial centers in FIG. 4A.

With respect to the distribution D of the Ln normal distributions provided as an example, we can easily image that this value 5 of Cn will certainly provide the best result in the step 118 and will be used in the step 122.

It clearly appears that a detection device like that described previously allows for precise reconfigurations as frequently as the user wants. It is therefore easy to adjust the detection device to the physical system being observed and even to the changes to this physical system over time, since the statistical hidden Markov models used for its detection are not fixed.

Also note that the invention is not limited to the embodiment described previously.

Specifically, the detection device may be designed in many forms since its observation module 12, processing module 14, and interface module 16 are separable. Its design can therefore adjust to the planned application and to the physical system being observed.

In addition, an algorithm other than the Baum-Welch algorithm may be used if it is equivalent in terms of optimizing parameters of a statistical hidden Markov model, to execute the step 118, an algorithm other than the K-Means algorithm may be used if it is equivalent in terms of classifying with an a priori known number of classes without supervision, to execute the steps 108 to 114, and other metrics or methods of calculating centers can be used to execute the steps 110 and 112.

More generally, as is known to those skilled in the art, there are various modifications that can be made to the embodiment described above, with respect to the teaching that has been disclosed. In the following claims, the terms used should not be interpreted as limiting the claims to the embodiment presented in this description, but should be interpreted to include all of the equivalents that the claims intend to cover by their formulation and whose projection is within reach of those skilled in the art by applying their general knowledge to the teaching that has just been disclosed.

The invention claimed is:

1. A method of configuring a device for detecting a situation from among a set of situations (S-1, . . . , S-N) where a physical system is observed by a least one sensor, comprising the following steps:

receiving a sequence of observation data of the physical system, called a training sequence (L-1, . . . , L-N), provided by the sensor and corresponding to a determined situation of the physical system, determining, from the training sequence, the parameters of a statistical hidden Markov model (HMM-1, . . . , HMM-N) recorded onto the detection device's storage media and relating to the determined situation, by prior initializing these parameters, then updating these initialized parameters, wherein the prior initialization comprises the following steps:

with the statistical model being used having a given number of hidden states, determining multiple probability distributions from the training sequence, by dividing the sequence into sub-sequences and assigning to each sub-sequence a probability distribution statistically modeling the respective sub-sequence, the number of determined probability distributions being greater than the number of hidden states in the statistical model being used, distributing said determined probability distributions among the hidden states of the statistical model being used such that a plurality of probability distributions are assigned to at least one of the hidden states, determining, for each hidden state in the statistical model being used and, from the probability distributions assigned to said hidden state, a single probability distribution that is representative of said hidden state, and initializing the parameters of the statistical model being used from the determined representative probability distributions, and wherein the method also includes a configuration step for the detection device such that the statistical model being used includes the parameters determined by said prior initialization and then said update, wherein, each probability distribution being a normal distribution, the single probability distribution that is representative of a hidden state Ki is a normal distribution that represents the center thereof and that is determined by the calculation of its expectation $\mu_i$ and its variance $\Sigma_i$ based on the expectations $\mu_{i,j}$ and variances $\Sigma_{i,j}$ of all probability distributions of this hidden state Ki, as follows:

$$\mu_i = \frac{1}{\text{Card}(Ki)} \sum_{j \in Ki} \mu_{i,j} \text{ and } \Sigma_i = \frac{1}{\text{Card}(Ki)} \sum_{j \in Ki} (\Sigma_{i,j} + \mu_{i,j}^H \mu_{i,j}) - \mu_i^H \mu_i,$$

where Card is the "Cardinal" function and H is the Hermitian transpose.

2. The configuration method according to claim 1, in which the distribution comprises the execution of an iterative K-Means algorithm on a number of classes equal to the number of hidden states in the statistical model being used (HMM-1, ..., HMM-N), this iterative algorithm comprising, at each iteration:
an estimate of distances between probability distributions using the Kullback-Leibler divergence.

3. The configuration method according to claim 2, in which the distribution comprises an initialization of the iterative K-Means algorithm, comprising:
sorting the probability distributions in ascending order of one of the parameters of said distributions, and
distributing the sorted probability distributions into the classes in this ascending order, from the first to the last class.

4. The configuration method according to claim 3, wherein the one of the parameters for sorting the determined probability distributions in ascending order is an expectation component of the distributions, and the distributing is performed such that a number k of the sorted probability distributions is assigned in order to each of the hidden states until there are no more hidden states, the number k being based on how many multiples the number of sorted probability distributions is of the number of hidden states.

5. The configuration method according to claim 3, in which, the sorting of the probability distributions during the initialization of the iterative K-Means algorithm involves sorting in ascending order of an expectation component of said normal distributions.

6. The configuration method according to claim 1, in which the update of the parameters of the statistical model being used (HMM-1, ..., HMM-N) includes the execution of the Baum-Welch algorithm on the training sequence (L-1, ..., L-N).

7. A method of configuring a device tier detecting a situation from among a set of situations (S-1, ..., S-N) where a physical system is observed by a least one sensor, comprising the following steps:
receiving sequence of observation data of the physical system, called a training sequence (L-1, ..., L-N), provided by the sensor and corresponding to a determined situation of the physical system,
determining, from the training sequence, the parameters of a statistical hidden Markov model (HMM-1, ..., HMM-N) recorded onto the detection device's storage media and relating to the determined situation, by prior initializing these parameters, then updating these initialized parameters,
wherein the prior initialization comprises the following steps:
with the statistical model being used having a given number of hidden states, determining multiple probability distributions from the training sequence, by dividing the sequence into sub-sequences and assigning to each sub-sequence a probability distribution statistically modeling the respective sub-sequence, the number of determined probability distributions being greater than the number of hidden states in the statistical model being used,
distributing said determined probability distributions among the hidden states of the statistical model being used such that a plurality of probability distributions are assigned to at least one of the hidden states,
determining, for each hidden state in the statistical model being used and, from the probability distributions assigned to said hidden state, a single probability distribution that is representative of said hidden state, and
initializing the parameters of the statistical model being used from the determined representative probability distributions,
and wherein the method also includes a configuration step for the detection device such that the statistical model being used includes the parameters determined by said prior initialization and then said update,
wherein the prior initialization of the parameters of the statistical model being used (HMM-1, ..., HMM-N) also comprises:
the initialization of the initial probabilities of each hidden state at a common value of equiprobability, and
the initialization of the matrix of transitions from each hidden state to each other at a matrix whose diagonal coefficients are equal to a first near value of 1, specifically between 0.8 and 1, and whose other coefficients are equal to a second near value of 0, specifically between 0 and 0.2.

8. The configuration method according to claim 7, wherein the single probability distribution that is representative of said hidden state is determined based on determining a probability distribution that represents a center or average of the probability distributions assigned to the hidden state.

9. An adaptive device for detecting a situation from among a set of situations (S-1, ..., S-N) where a physical system is observed by at least one sensor, from observation data of the physical system provided by the sensor, comprising:
the at least one sensor for providing a sequence of observation data of the physical system; and
circuitry configured to
receive a sequence of observation data of the physical system, called a training sequence (L-1, ..., L-N), provided by the sensor and corresponding to a determined situation of the physical system, and
determine, from the training sequence, the parameters of a statistical hidden Markov model (HMM-1, ..., HMM-N) recorded onto a memory and relating to the determined situation, by prior initializing these parameters, then updating these initialized parameters,
wherein the circuitry is configured to perform the prior initialization by performing the following steps:
with the statistical model being used having a given number of hidden states, determining multiple probability distributions from the training sequence, by dividing the sequence into sub-sequences and assigning to each sub-sequence a probability distribution statistically modeling the respective sub-sequence, the number of determined probability distributions being greater than the number of hidden states in the statistical model being used,
distributing said determined probability distributions among the hidden states of the statistical model being used such that a plurality of probability distributions are assigned to at least one of the hidden states, determining, for each hidden state in the statistical model being used and, from the probability distributions assigned to said hidden state, a single probability distribution that is representative of said hidden state, and initializing the parameters of the statistical model being used from the determined representative probability distributions, and the circuitry is configured to perform a configuration step such that the statistical model being used includes the parameters determined by said prior initialization and then said update, wherein, each probability distribution being a normal distribution, the single probability distribution that is representative of a hidden state Ki is a normal distribution that represents the center thereof and that is determined by the calculation of its expectation $\mu_i$ and its variance $\Sigma_i$ based on the expectations $\mu_{i,j}$ and variances $\Sigma_{i,j}$ of all probability distributions of this hidden state Ki, as follows:

$$\mu_i = \frac{1}{\text{Card}(Ki)} \sum_{j \in Ki} \mu_{i,j} \text{ and } \Sigma_i = \frac{1}{\text{Card}(Ki)} \sum_{j \in Ki} (\Sigma_{i,j} + \mu_{i,j}^H \mu_{i,j}) - \mu_i^H \mu_i,$$

where Card is the "Cardinal" function and is the Hermitian transpose.

10. The adaptive device according to claim 9, in which the sensor includes at least one of the elements of the set comprised of a movement sensor with at least one measurement axis, a pressure monitor, a heart rate monitor, and a glucose monitor.

11. A non-transitory computer readable medium that stores a program, that when executed by a detection device for detecting a situ ton from among a set of situations (S-1, . . . , S-N) where a physical system is observed by a least one sensor, causes the detection device to perform a method comprising:

receiving a sequence of observation data of the physical system, called a training sequence (L-1, . . . , L-N), provided by the sensor and corresponding to a determined situation of the physical system, determining, from the training sequence, the parameters of a statistical hidden Markov model (HMM-1, . . . , HMM-N) recorded onto the detection device's storage media and relating to the determined situation, by prior initializing these parameters, then updating these initialized parameters, wherein the prior initialization comprises the following steps:

with the statistical model being used having a given number of hidden states, determining multiple probability distributions from the training sequence, by dividing the sequence into sub-sequences and assigning to each sub-sequence a probability distribution statistically modeling the respective sub-sequence, the number of determined probability distributions being greater than the number of hidden states in the statistical model being used, distributing said determined probability distributions among the hidden states of the statistical model being used such that a plurality of probability distributions are assigned to at least one of the hidden states, determining, for each hidden state in the statistical lode being used and, from the probability distributions assigned to said hidden state, a single probability distribution that is representative of said hidden state, and initializing the parameters of the statistical model being used from the determined representative probability distributions, and wherein the method also includes a configuration step for the detection device such that the statistical model being used includes the parameters determined by said prior initialization and then said update, wherein, each probability distribution being a normal distribution, the single probability distribution that is representative of a hidden state Ki is a normal distribution that represents the center thereof and that is determined by the calculation of its expectation $\mu_i$ and its variance $\Sigma_i$ based on the expectations $\mu_{i,j}$ and variances $\Sigma_{i,j}$ of all probability distributions of this hidden state Ki, as follows:

$$\mu_i = \frac{1}{\text{Card}(Ki)} \sum_{j \in Ki} \mu_{i,j} \text{ and } \Sigma_i = \frac{1}{\text{Card}(Ki)} \sum_{j \in Ki} (\Sigma_{i,j} + \mu_{i,j}^H \mu_{i,j}) - \mu_i^H \mu_i,$$

where Card is the "Cardinal" function and H is the Hermitian transpose.

12. An adaptive device for detecting a situation from among a set of situations (S-1, . . . , S-N) where a physical system is observed by at least one sensor, from observation data of the physical system provided by the sensor, comprising:

the at least one sensor for providing a sequence of observation data of the physical system; and circuitry configured to receive a sequence of observation data of the physical system, called a training sequence (L-1, . . . , L-N), provided by the sensor and corresponding to a determined situation of the physical system, and determine, from the training sequence, the parameters of a statistical hidden Markov model (HMM-1, . . . , HMM-N) recorded onto a memory and relating to the determined situation, by prior initializing these parameters, then updating these initialized parameters, wherein the circuitry is configured to perform the prior initialization by performing the following steps:

with the statistical model being used having a given number of hidden states, determining multiple probability distributions from the training sequence, by dividing the sequence into sub-sequences and assigning to each sub-sequence a probability distribution statistically modeling the respective sub-sequence, the number of determined probability distributions being greater than the number of hidden states in the statistical model being used, distributing said determined probability distributions among the hidden states of the statistical model being used such that a plurality of probability distributions are assigned to at least one of the hidden states, determining, for each hidden state in the statistical model being used and, from the probability distributions assigned to said hidden state, a single probability distribution that is representative of said hidden state, and initializing the parameters of the statistical model being used from the determined representative probability distributions, and the circuitry is configured to perform a configuration step such that the statistical model being used includes the parameters determined by said prior initialization and then said update, wherein the prior initialization of the parameters of statistical model being used (HMM-1, . . . , HMM-N) also comprises:

the initialization of the initial probabilities of each hidden state at a common value of equiprobability, and the initialization of the matrix of transitions from each hidden state to each other at a matrix whose diagonal coefficients are equal to a first near value of 1, specifically between 0.8 and 1, and whose other coefficients are equal to a second near value of 0, specifically between 0 and 0.2.

13. A non-transitory computer readable medium that stores a program, that when executed by a detection device for detecting a situation from among a set of situations (S-1, . . . , S-N) where a physical system is observed by a least one sensor, causes the detection device to perform a method comprising:

receiving a sequence of observation data of the physical system, called a training sequence (L-1, . . . , L-N), provided by the sensor and corresponding to a determined situation of the physical system, determining, from the training sequence, the parameters of a statistical hidden Markov model (HMM-1, . . . HMM-N) recorded onto the detection device's storage media and relating to the determined situation, by prior initializing these parameters, then updating these initialized parameters, wherein the prior initialization comprises the following steps:

with the statistical model being used having a given number of hidden states, determining multiple probability distributions from the training sequence, by dividing the sequence into sub-sequences and assigning to each sub-sequence a probability distribution statistically modeling the respective sub-sequence, the number of determined probability distributions being greater than the number of hidden states in the statistical model being used, distributing said determined probability distributions among the hidden states of the statistical model being used such that a plurality of probability distributions are assigned to at least one of the hidden states, determining, for each hidden state in the statistical model being used and, from the probability distributions assigned to said hidden state, a single probability distribution that is representative of said hidden state, and initializing the parameters of the statistical model being used from the determined representative probability distributions, and wherein the method also includes a configuration step for the detection device such that the statistical model being used includes the parameters determined by said prior initialization and then said update, wherein the prior initialization of the parameters of the statistical model being used (HMM-1, . . . HMM-N) also comprises:

the initialization of the initial probabilities of each hidden state at a common value of equiprobability, and the initialization of the matrix of transitions from each hidden state to each other at a matrix whose diagonal coefficients are equal to a first near value of 1, specifically between 0.8 and 1, and whose other coefficients are equal to a second near value of 0, specifically between 0 and 0.2.

* * * * *